United States Patent [19]

Willdorf

[11] 4,075,386
[45] * Feb. 21, 1978

[54] SECURITY FILM FOR SHATTERPROOFING WINDOWS

[75] Inventor: Michael E. Willdorf, Malden, Mass.

[73] Assignee: Material Distributors Corporation, Woburn, Mass.

[ * ] Notice: The portion of the term of this patent subsequent to June 24, 1992, has been disclaimed.

[21] Appl. No.: 597,481

[22] Filed: July 21, 1975

Related U.S. Application Data

[60] Division of Ser. No. 295,816, Oct. 10, 1972, Pat. No. 3,899,621, and a continuation-in-part of Ser. No. 113,426, Feb. 8, 1971, Pat. No. 3,775,226.

[51] Int. Cl.$^2$ .......................... B44F 1/00; B32B 17/06
[52] U.S. Cl. ...................................... 428/216; 156/71; 156/99; 156/104; 156/106; 156/307; 156/308; 428/40; 428/334; 428/335; 428/336; 428/424; 428/458

[58] Field of Search ................. 428/215, 40, 216, 334, 428/336, 424, 458; 156/99, 104, 106, 307, 308, 71

[56] References Cited

U.S. PATENT DOCUMENTS

| | | | |
|---|---|---|---|
| 1,999,253 | 4/1935 | Norris | 156/305 |
| 3,438,846 | 4/1969 | Cohen et al. | 428/215 |
| 3,657,057 | 4/1972 | Shorr et al. | 156/99 X |
| 3,703,426 | 11/1972 | Larson et al. | 156/308 |
| 3,775,226 | 11/1973 | Windorf | 428/216 |
| 3,891,486 | 6/1975 | Willdorf | 156/99 X |
| 3,899,621 | 8/1975 | Willdorf | 428/216 |
| 3,949,134 | 4/1976 | Willdorf | 156/99 X |

Primary Examiner—Thomas J. Herbert, Jr.
Attorney, Agent, or Firm—Morse, Altman, Oates & Bello

[57] ABSTRACT

A security film for shatter-proofing windows comprises a polyurethane stratum interposed between a pair of polyester strata, each of which is self supporting, the film being bonded to the inner face of the window by a pressure sensitive adhesive.

6 Claims, 5 Drawing Figures

SECURITY FILM FOR SHATTERPROOFING WINDOWS

RELATED APPLICATIONS

The present application is a continuation-in-part of application Ser. No. 113,426, filed Feb. 8, 1971, now U.S. Pat. No. 3,775,226, issued Nov. 27, 1973, and is a division of application Ser. No. 295,816, filed Oct. 10, 1972, now U.S. Pat. No. 3,899,621, issued Aug. 12, 1975.

BACKGROUND AND SUMMARY

The present invention relates to a security film for shatter-proofing windows against impact or explosion, and, more particularly, to security film for application to one face of a window as a shield to prevent fragmentation of glass notwithstanding its splintering or cracking when damaged. Prior security films, when adhered to window faces, have tended to rip in the event of impact or explosion to the accompaniment of flying glass, which is the primary danger that safety film is intended to prevent.

The object of the present invention is to provide, as a security film for shatterproofing ordinary window panes, a laminated assemblage in which at least one polyurethane stratum is interposed between at least a pair of polyester strata, each of the latter of which are self supporting, and one of the latter of which is provided with a pressure sensitive surface. It has been found that such an assemblage, when adhered to the inner or outer face of an ordinary window pane, is characterized by an unusual ability to absorb energy without rupture, possibly because of the microstructure of the polyester which is devoid of surface discontinuities, the tenacity with which polyurethane can be bonded to polyester and the energy redistribution of which the entire assemblage is capable when incrementally under stress.

Another object of the present invention is to provide a process for applying such an assemblage to the inside or outside of an ordinary window pane, by wetting the pressure sensitive adhesive with an aqueous detergent, which permits the assemblage to be slipped into optically clear contact with the window pane face and which then evaporates through the assemblage, which fortuitously is moisture permeable, and via its edges to permit activation of the pressure sensitive adhesive.

Other objects of the present invention are to provide, in an assemblage of the present invention: a vapor deposited aluminum coat on at least one of the polyester strata for reduction of infrared transmission; and/or an ultra-violet absorbing pigment for reduction of ultraviolet transmission.

Further objects of the present invention will in part be obvious and will in part appear hereinafter The invention accordingly comprises the products and processes of the present invention, together with their components, steps and interrelationships, which are referred to in the present disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawing wherein.

DETAILED DESCRIPTION

Figure 1:
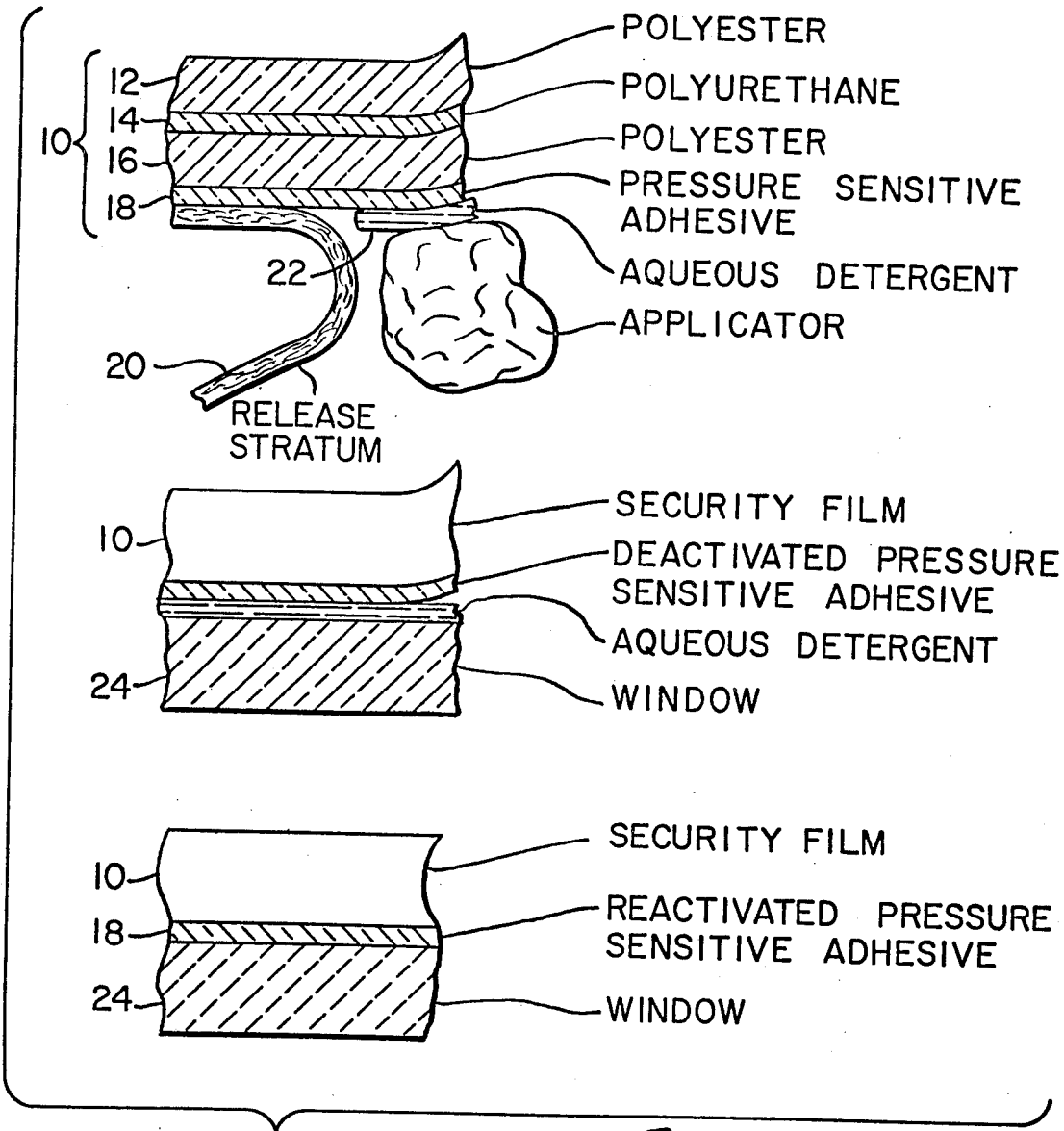
FIG. 1 is a flow diagram illustrating a security film, in exaggerated cross section, undergoing a process of the present invention.

Generally, the security film of FIG. 1, which is flexible, comprises, in laminated sequence, a moisture permeable polyester stratum 12, an elastomeric polyurethane bonding stratum 14, a moisture permeable polyester stratum 16 and a pressure sensitive adhesive stratum 18. All of these strata are optically clear and transparent. Typically polyester strata 12 and 16 are of the type sold by Dupont under the trademark Mylar or by I.C.I. under the trademark Melinex. Typically polyurethane bonding stratum 14 is formed as an elastomer by casting a mixture of an isocyanate containing component and a hydroxyl containing component on one of the faces of polyester strata 12, 16, then superposing another of the faces thereon and compressing the two strata during heat curing. Typically pressure sensitive adhesive 18 is composed of a mixture of synthetic and natural rubbers, e.g. neoprene and latex, a tackifier such as terpene, and an organic solvent such as toluene or methyl ethyl ketone. This pressure sensitive adhesive is optically clear and transparent.

Preferably, polymeric strata 12 and 14 each ranges in thickness from 0.5 to 5 mils, elastomeric bonding stratum 14 ranges in thickness from 0.2 to 0.4 mils and pressure sensitive adhesive 18 ranges in thickness from 0.5 to 1.5 mils.

As shown in FIG. 1, following stripping of a silicone release stratum 20 from pressure sensitive adhesive stratum 18, a clear aqueous detergent 22 is applied to pressure sensitive stratum 18 in order to deactivate the pressure sensitive adhesive during application of the film shown at 10, to a window 24. During such superposition, the aqueous detergent coat serves as a lubricant to permit smoothing of the film and elimination of air pockets between the film and the window. Following application of the film to the window, the aqueous detergent diffuses through the edges of the interface between the film and the window and through the film itself. In order to facilitate such evaporation, preferably all of the strata of the film are selected for their vapor permeability, the pressure sensitive adhesive in particular being vapor permeable but insoluable with respect to water. In other words, the detergent is polar and the pressure sensitive adhesive is non-polar.

Figure 2:
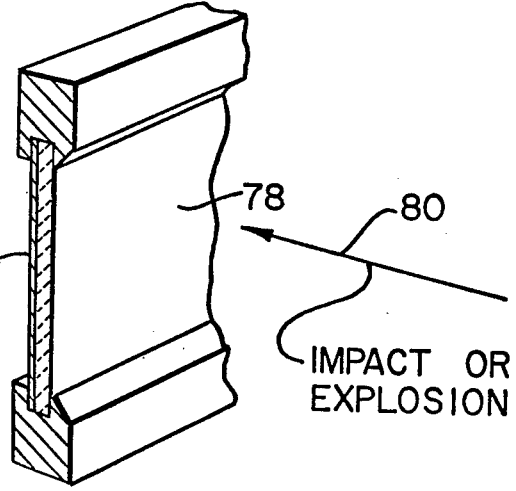
FIG. 2 illustrates a window incorporating the present invention.
Figure 3:
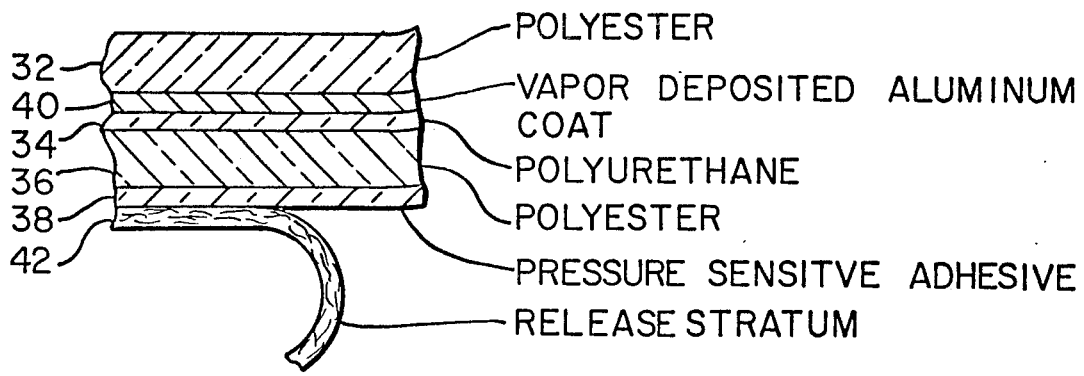
FIG. 3 is an alternative product, in exaggerated cross section, analogous to the product of FIG. 1.

The alternative embodiment of FIG. 3 comprises, in laminated sequence, a moisture permeable polyester stratum 32, an elastomeric polyurethane bonding stratum 34, a moisture permeable polyester stratum 36, a pressure sensitive adhesive stratum 38, and a release stratum 42, all analogous to their counterparts in the embodiment of FIG. 1. In addition, this alternative embodiment comprises a vapor deposited aluminium coat 40 that is characterized by a visible light transmission of 5% to 60% and a thickness of no more than 300 angstrom units. In a modification of the embodiment of FIG. 2, one or both of the polyester strata contains an ultraviolet absorbent, for example, a dispersed substituted benzophenone of the type sold by Antara Chemicals under the trademark Uvinul.

Figure 4:
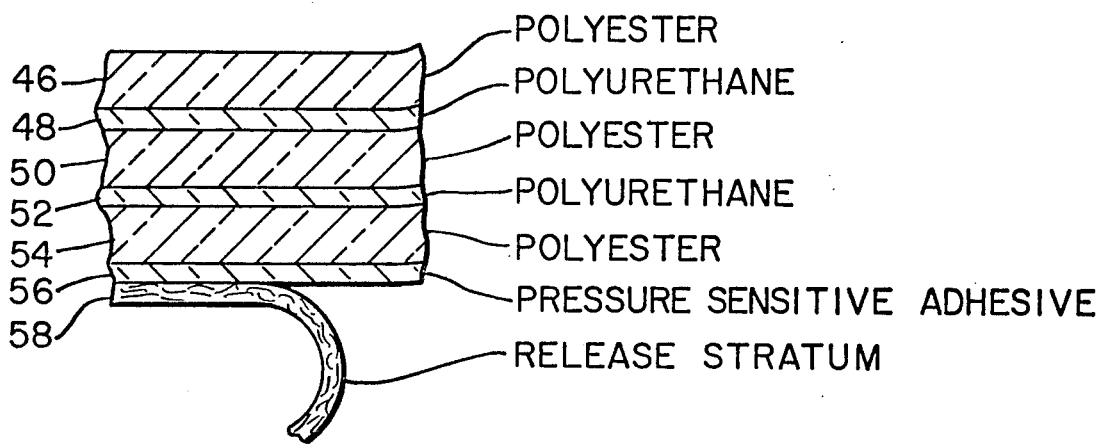
FIG. 4 is another alternative product embodying the present invention.
Figure 5:
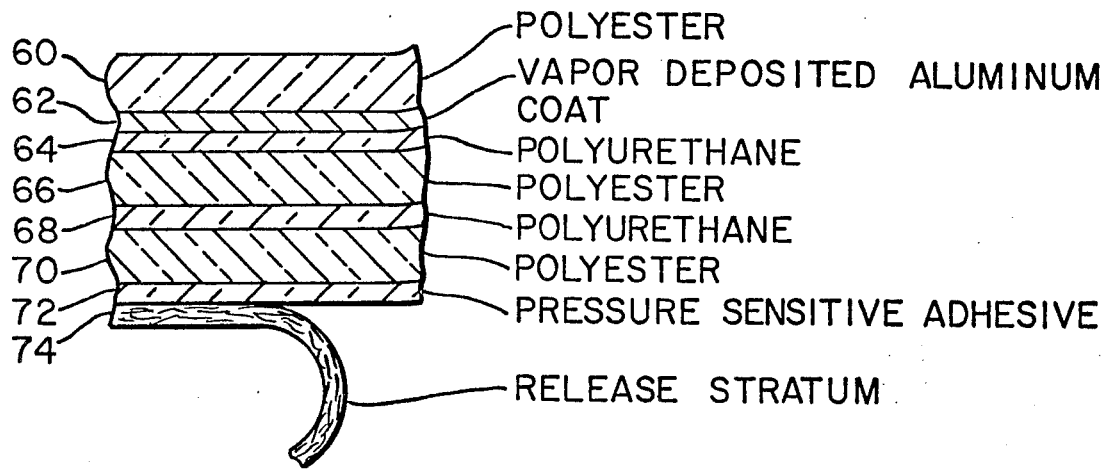
FIG. 5 is a further alternative product embodying the present invention.

Alternative heavier duty security films embodying the present invention are shown in FIGS. 3 and 4. The security film of FIG. 4 comprises in laminated sequence a polyester stratum 46, a polyurethane stratum 48, a polyester stratum 50, a polyurethane stratum 52, a polyester stratum 54, a pressure sensitive adhesive stratum 56 and a release stratum 58. The security film of FIG. 5 comprises all of the strata of FIG. 4, designated 60, 64, 66, 68, 70, 72, and 74, and additionally an interposed vapor deposited aluminum coat 62. In FIGS. 4 and 5, the polyester strata, polyurethane strata, vapor deposited strata, pressure sensitive strata and release strata are analogous to their counterparts in FIGS. 1 and 3.

In operation of each of the security films of FIGS. 1, 3 and 4, the security film is applied at 76 to the inside or outside face of a window pane 78. When in position, the security film of FIGS. 1 or 4 is capable of preventing fragmentation of window 78 when it is cracked or otherwise damaged by an external impact or explosion at a position 80. When in position, the security film of FIG. 2 or 5, in addition to serving the function of that of FIG. 1 or 4, serves as a solar control window for reduction of transmission of infrared, visible and ultraviolet radiation.

The present invention accordingly comprises a security film for application to an ordinary window pane in order to render it splinter proof. Since certain changes may be made in the foregoing disclosure without departing from the scope of the invention herein involved, it is intended that all matter shown in the accompanying drawing or described in the foregoing specification be interpreted in an illustrative and not in a limiting sense.

What is claimed is:

1. A process for producing a security window, said process comprising the steps of applying a security film to a window surface with a polar aqueous detergent interposed therebetween, said security film comprising an assemblage of strata including at least one first polyester support stratum, at least one second polyester support stratum, at least one elastomeric bonding stratum, and only one nonpolar pressure sensitive adhesive stratum, said one first polyester support stratum and said one second polyester stratum each being composed of polyethylene terephthalate and ranging from 0.5 to 5 mils in thickness, said one elastomeric bonding stratum being composed of polyurethane and being interposed between said one first polyester support stratum and said one second polyester support stratum and in direct contact with the inner faces of said one first polyester support stratum and said one second polyester support stratum, said polyurethane bonding stratum ranging in thickness from 0.2 to 0.4 mil, said pressure sensitive stratum being coated on one of the outer faces of said assemblage for adhesion to said only one face of only one sheet of window glass, said pressure sensitive stratum being composed of a composition including a rubber and a tackifier and ranging in thickness from 0.5 to 1.5 mil, all of the strata of said assemblage being optically clear and moisture permeable, said pressure sensitive stratum being deactivated by said aqueous detergent, and permeating water from said aqueous detergent out of the interface between said security film and said window surface in order to reactivate said pressure sensitive adhesive stratum.

2. The process of claim 1 wherein at least one of said one first polyester stratum and said one second polyester stratum contains an ultraviolet absorbing dye.

3. The process of claim 1 wherein there are two polyester strata and one bonding stratum.

4. The process of claim 1 wherein there are more than two polyester strata and more than one bonding stratum.

5. The process of claim 1 wherein a light transmitting aluminum coat is vapor deposited on one inner face of said one first polyester stratum and said one second polyester stratum.

6. The process of claim 5 wherein said vapor deposited aluminum coat is characterized by a visible light transmission ranging from 5 to 60% and a thickness of no more than 300 angstrom units.

* * * * *